Oct. 31, 1944. F. C. DE REAMER Re. 22,560

OPERATING MECHANISM FOR FLUORESCENT LAMPS

Original Filed March 6, 1940

Inventor:
Frank C. De Reamer,
by Harry E. Dunham
His Attorney.

Reissued Oct. 31, 1944

Re. 22,560

UNITED STATES PATENT OFFICE 22,560

OPERATING MECHANISM FOR FLUORESCENT LAMPS

Frank C. De Reamer, Bridgeport, Conn., assignor to General Electric Company, a corporation of New York Original No. 2,276,829, dated March 17, 1942, Serial No. 322,560, March 6, 1940. Application for reissue August 17, 1943, Serial No. 499,002

17 Claims. (Cl. 173—328)

This invention relates to an operating mechanism for electric discharge devices, and more particularly to a combined means for supporting and starting a fluorescent lamp of the well-known type now in commercial use.

One object of the invention is the provision of improved means for supporting the lamp and its starting mechanism in positions immediately adjacent each other to facilitate servicing of these parts.

Another object of the invention is the provision of a receptacle for the starting mechanism so constructed as to be mounted on the socket which supports the lamp.

Still another object of the invention is the provision of a receptacle for a lamp starting mechanism of the termal switch or glow discharge type so arranged as to mount the switch in position for easy accessibility and replacement.

A further object is to provide an adapter and housing for the starting switch which may be assembled together and supported on the socket which mounts the fluorescent lamp.

Figure 1:
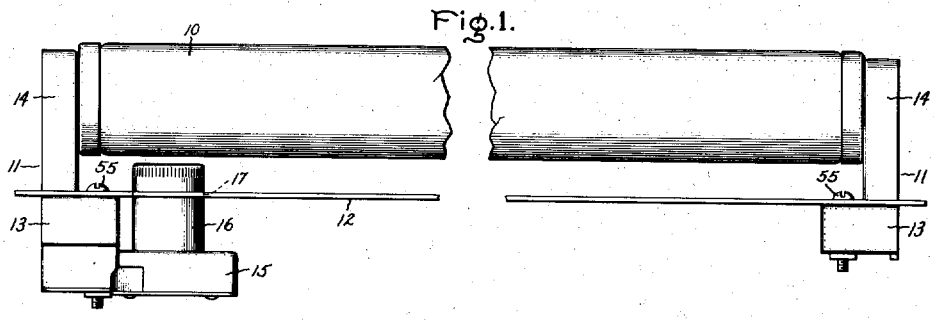
Figure 2:
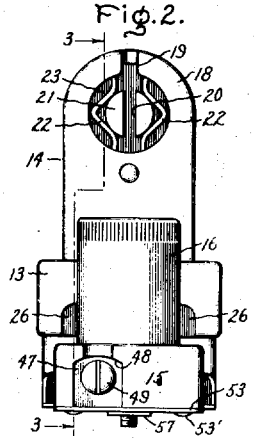
Figure 3:
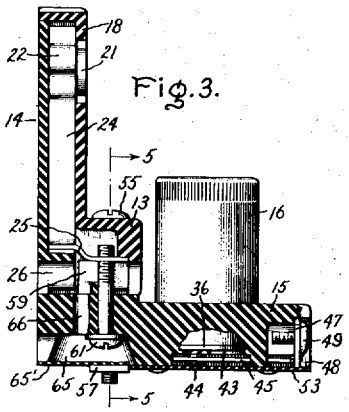
Figure 6:
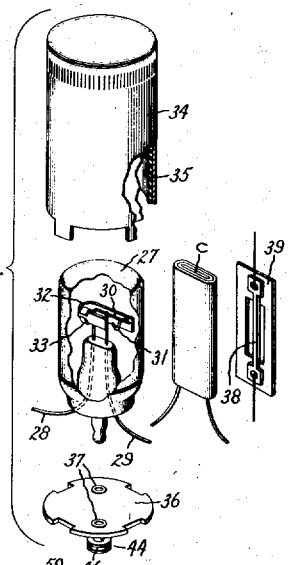
Figure 4:
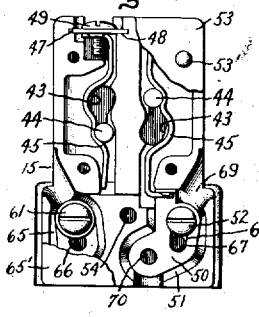
Figure 5:
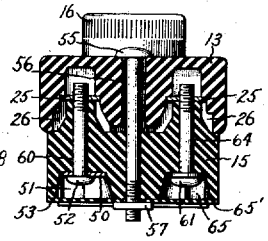
Figure 7:
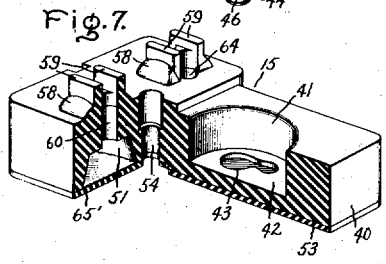
Figure 8:
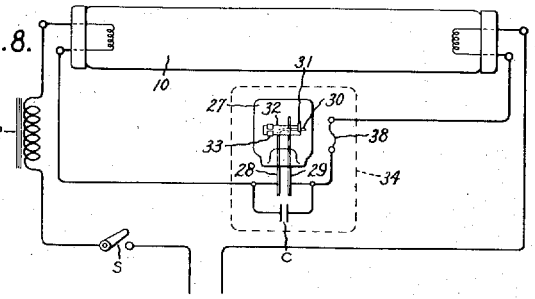

In the accompanying drawing Fig. 1 is a view showing the assembly of the fluorescent lamp, mounting sockets, adapter and starting mechanism; Fig. 2 is an elevational view of the starter, adapter and lamp socket; Fig. 3 is a sectional view of these elements taken along the line 3—3 of Fig. 2; Fig. 4 is a plan view of the bottom of the adapter, a portion of the adapter being broken away; Fig. 5 is a sectional view through the lamp socket and adapter taken along the line 5—5 of Fig. 3, and illustrating the manner in which these elements are assembled together; Fig. 6 is an exploded view of the starting mechanism; Fig. 7 is a perspective view, partly in section, of the adapter, and Fig. 8 is a diagrammatic view showing the circuit for electrically interconnecting the fluorescent lamp and starting mechanism.

In the accompanying drawing is illustrated an electric discharge device such as a fluorescent lamp 10 of the well-known type now in commercial use. The lamp is provided with spaced contact pins (not shown) at each end for mounting it in sockets 11 disposed at the ends of the lamp. As shown in Fig. 1, the sockets are mounted on a support or reflecting surface 12 and are provided with base portions 13 beneath the reflecting surface for connection with a wiring system and with extensions 14 above the reflecting surface for receiving the ends of the lamp in the manner indicated. This is the customary manner employed in mounting the fluorescent lamp in fixtures or reflectors for use in a wide variety of installations. Fluorescent lamps of the type mentioned require a starting switch for applying current to the cathodes of the lamp to heat them to a point at which they become emissive, and an impedance, such as a reactor, to limit the current flow through the cathodes. Once the cathodes are heated, a discharge arc is struck between the cathodes, lighting the lamp and shorting out the switch. The switch and reactor are commonly known to the trade as "auxiliaries."

In many installations the "auxiliaries" are placed at a point remote from the fluorescent lamp and its associated reflector because the mounting reflector or fixture is usually of restricted size and commonly employs various decorative features or arrangements such that there is not sufficient space for mounting the "auxiliaries." Of the "auxiliaries" the starting switch is the more likely to get out of order to prevent operation of the fluorescent lamp. If the "auxiliaries" are mounted at a point remote from the lamp in the manner aforementioned, considerable difficulty may be experienced in disassembling the supporting structure for the lamp to render the auxiliaries accessible for replacement or repair of the damaged part. By this invention, however, it is proposed to provide a mounting medium for the switch so arranged that it will be located at a point just as accessible as the lamp for easy replacement, obviating the necessity of costly tearing down and rebuilding of the lamp assembly. The reactor is constructed of relatively rugged material and seldom if ever needs attention so that if provision is made for easy replacement of the starting switch it will be possible to take care of most cases wherein shutdown of the lamp is due to failure of the "auxiliaries."

To this end, I provide an adapter or mounting member 15 which is securely fastened to one of the lamp sockets and the adapter, in turn, acts as a support for a starting switch 16. In the preferred embodiment of the invention the adapter 15 is secured to the base 13 of the lamp socket beneath the reflector or mounting panel 12, and a portion of the starting switch projects through an opening 17 in the panel to a point above its surface but immediately beneath the fluorescent lamp 10 so that the upper portion of the switch may be readily grasped by the hand for ready removal from the adapter through the opening 17. This means that the starting switch may be replaced simply by taking the fluorescent lamp out of its supports and then replacing the defective switch with an operative one. The switch is thus located at a point where it is easily accessible. The structure of the lamp socket, starting switch and adapter will now be described in detail.

Referring to Fig. 2, the lamp socket may be of the type disclosed in Letters Patent 2,137,174 of Anthony J. Marshaus assigned to the same assignee as the instant application. It comprises a housing 18 of any suitable insulating material; the extended portion 14 of the socket housing is provided with a slot 19 extending to the outer edge thereof which is in radial alignment with a diametrical slot 20 of an annular stud 21. Opposed contact members 22 are disposed on each side of the stud 21 within a recess 23 so that the contact pins of the fluorescent lamp may be inserted in a straight line through the slots 19 and 20 and then rotated, by rotating the lamp, into engagement with the respective contacts 22 on opposite sides of the annular stud. The contact members 22 comprise flexible spring blades having shanks 24 which extend to the base 13 of the socket and are provided with terminal plates 25 for connection with the conductors of the wiring system; the connections are made by conventional terminal screws (not shown). Connections to the terminal plates are effected through slots or openings 26 in the base of the socket.

Referring to Fig. 6 the starting switch may be of the glow discharge type such as that disclosed in the copending application of Wayne C. Smitley, Serial No. 289,897, filed August 12, 1939, and assigned to the same assignee as the instant application. The switch elements are contained within a sealed glass envelope 27 through which lead-in wires 28 and 29 conduct current to a pair of contacts 30 and 31. The contact 30 is formed by a bent-over extension of the lead-in wire 28 while the contact 31 is a separate piece of wire mounted on a U-shaped bimetallic element 32 carried by the other lead-in wire 29. A piece of emissive material 33 is placed on the bimetallic strip adjacent the bent-over extension of the lead-in wire 28 to increase the glow discharge between these two elements.

As shown in the circuit diagram of Fig. 8, the glow discharge switch is placed in series with one of the terminals of the filament at each end of the lamp, the other terminals of the filaments being placed in series with a reactor R and the lead lines of a power circuit. A switch S controls power to the assembly. Upon closure of the switch S current flows through the reactor R and the left-hand filament of the lamp and thence to the lead-in wire 28, and a glow discharge takes place between this lead wire and the lead wire 29 to conduct current to the right-hand filament of the lamp and thence to the other side of the power line. The glow discharge between the lead wires 28 and 29 heats up the bimetallic strip 32 and causes its to flex in a manner to close the contacts 30 and 31. Upon closure of the contacts 30 and 31 the full line voltage is applied to the filaments of the lamp. Simultaneously, the glow discharge between the lead wires 28 and 29 is shorted out by closure of contacts 30 and 31. As soon as the glow discharge ceases the bimetallic element 32 begins to cool, but inasmuch as it has a thermal time lag the contacts 30 and 31 will not be immediately reopened so that current continues to flow through the lamp filaments causing them to heat to a point at which they give off an electron discharge. It has been found that a time lag of approximately one to three seconds in the opening of the contacts 30 and 31 is sufficient to permit proper heating of the lamp filaments. Upon opening of the contacts 30 and 31 the glow switch is thrown out of the circuit so that full line voltage is applied across the filaments of the lamp, and a sudden surge in voltage is supplied by the reactor R. This results in an arc discharge taking place between the heated filaments of the lamp so that the lamp lights. When this occurs current from the power line flows directly through the lamp arc discharge. Consequently, the glow switch remains out of the circuit and the contacts 30 and 31 remain open so that the glow switch is reset. In addition to providing a voltage surge for starting the lamp, the reactor limits the current through the filaments during heating and through the lamp during operation of it. A small condenser C of approximately .006 mfd. is placed across the lead-in wires 28 and 29 to prevent radio interference.

In order to provide a housing for the glow switch to permit its being mounted on one of the lamp sockets 11, the glass envelope 27 is enclosed within a cylindrical metal casing 34 having a liner of insulating material 35 such as sheet fiber. The open end of the casing 34 is closed by a fiber disk 36 provided with two contact prongs 37 for electrical connection with the adapter 15. The condenser C is likewise disposed within the casing 34 in a position immediately adjacent the glass envelope 27. In some cases it has been found that failure of the contacts 30 and 31 to close has resulted in prolonged heating of the switch mechanism under action of the glow discharge between the wires 28 and 29. This may cause serious damage when the generated heat is confined within the casing 34. In order to prevent overheating of the switch casing and possible damage to the surrounding support and lamp, a fusible element 38 mounted on a supporting plate of insulating material 39 is likewise disposed within the casing 34 and is connected in series with one of the leads 28 or 29. Fuse link 38 is responsive to the ambient temperature within the housing 38. Should the glow switch operate an undue length of time such as to cause possible burning or damage to a supporting structure, the fuse 38 will melt cutting off current to the glow switch. When this occurs the starting unit comprising the glow switch, condenser and fuse must be replaced in the lamp assembly. Electrical connection to the unit is effected by the contact prongs 37 to which a lead from the glow switch and fuse are connected.

In order to mount the container 34 on the lamp socket, I provide the aforementioned adapter or supporting member 15 which is formed with a housing of insulating material 40 having an annular recess 41 for receiving the switch container 34. The bottom of the recess 42 is formed with two annularly arranged keyhole slots 43 for receiving the connector prongs 37. The prongs 37 have enlarged ends 44 which extend through the keyhole slots and engage spring contact members 45 mounted on the bottom of the housing 40 and disposed at points adjacent the walls of the keyhole slots. The contact elements 45 are formed of round spring wire which rest in grooves 46 formed in the enlarged ends of the switch connector prongs 37. The container is securely locked within the adapter simply by placing it in the recess and inserting the enlarged ends of the connector prongs 37 through the large openings of the keyhole slots and slightly rotating the container to move the ends of the prongs beneath the narrower portions of the keyhole slots. In this position the prongs are in electrical contact with the wire contact elements 45 which are biased into engagement with the grooves 46 of the connector prongs. A terminal plate 47 rests in a groove 48 at one end of the housing and is spot welded, or otherwise suitably secured, to one of the spring contacts 45. A terminal screw 49 is threaded into plate 47 for making an electrical connection therewith. The other spring contact 45 is provided with a terminal plate 50 resting in a recess 51 at the other end of the housing. A screw 52 cooperates with the terminal plate 50 in a manner to be described later. The contacts 45 and terminal plate 47 are held securely in position on the housing by a closure plate 53 of insulating material, such as sheet fiber, which, in turn, is fastened to the housing by drive pins 53'. It is proposed to mount the adapter upon the socket 11. To this end the adapter housing 40 is provided with an opening 54 for the reception of a bolt 55, the bolt passing through a slot 56 in the base portion 13 of the socket 11, as shown in Fig. 5. A nut 57 on the end of the bolt permits these elements to be clamped together securely. Bolt 55 is also used to mount the socket and assembled adapter on the reflector surface 12, as shown by Fig. 1. In order to position the adapter upon the socket for electrical connection thereof, the upper face of the adapter body is provided with upstanding bosses or lugs 58, each formed with spaced ears 59, which are seated within the recesses 26 in the base 13 of the socket ordinarily used for the reception of electric conductors. The ears 59 cooperate with the side walls of the recesses in the base and prevent the adapter from turning relative to the socket.

In those cases where the socket is to be used with the adapter the terminal screws which come with the socket are removed and are replaced with extra long screws furnished with the adapter which pass through the body of the adapter and make contact with the respective contact members 25. As shown most clearly in Figs. 4 and 5, one of the long screws is the aforementioned terminal screw 52 which extends from the terminal plate 50 of the adapter through an opening 60 in the adapter housing to a corresponding terminal plate 25 on the lamp socket so that these elements are electrically interconnected. The opening 60 is positioned between the ears 59 of the corresponding lug so that the connecting screw 52 is correctly positioned for threading into the corresponding terminal plate 25. A second long terminal screw 61 extends through an opening 64, located between the ears of the other lug, for engagement with the other terminal plate 25 of the socket; the head of the screws rests in a recess 65 in the adapter housing. This furnishes an electrical connection to the other socket contact. The recesses 51 and 65 are covered by a plate 65' of insulating material, such as sheet fiber which is held in position beneath the nut 57 and protects the terminal screws 52 and 61. The terminal screws 52 and 61 themselves hold the adapter and socket in assembled relationship as well as affording electrical connection to these elements. This means that bolt 55 may be omitted from the assembly in those cases where it is desired to mount the socket in a manner other than that shown by Fig. 1.

The assembled socket, adapter and starting switch are connected in circuit with the other socket and the reactor by running a wire from one terminal of the other socket to the terminal screw 49 of the adapter and a second wire from the reactor to the adapter terminal screw 61. Line voltage is then fed to the other socket and reactor in accordance with the circuit diagram of Fig. 8. Current flows from one end of the line through the reactor to terminal screw 61, through the screw to terminal plate 25 of the lamp socket, then through contact 24, the lamp filament to the other socket contact 24 and corresponding terminal plate to screw 52, through spring contact 45, the starting switch, the other spring contact to screw 49, and thence to the socket at the other end of the lamp, the other lamp filament and the other side of the power line.

Provision is made for mounting the adapter on lamp sockets other than the particular one described above which forms the subject matter of the aforementioned Marshaus patent. To this end the adapter is provided with openings 66 and 67 offset from the openings 60 and 64 and which extend through the adapter housing between the ears 59 of the lugs. They are adapted to receive the connecting screws 52 and 61 in the manner aforementioned. This means that the relative positions of the adapter and socket may be varied in accordance with the requirements of the particular socket with which the adapter is used. Repositioning of the screw 52 in the terminal plate 50 is accomplished by slotting the opening in the plate through which the screw passes, as shown at 68 in Fig. 4. In any particular instance, however, only one pair of openings is utilized to receive the connecting screws 52 and 61 for threading into the corresponding terminal plates 25 of the lamp socket.

In some instances it may be desirable to mount the starting switch at a point remote from the lamp sockets; for example, where the sockets are surface mounted with the bases 13 of the sockets located on top of the supporting plate 12. In such cases the adapter may be mounted separately from the socket and electrical connections may be made to it through the terminal screw 49 and likewise directly to the terminal plate 50 through an opening 69 in the housing adjacent the recess 51. A terminal screw (not shown) may be threaded into the terminal plate 50 through a threaded opening 70. This means that the glow switch may be placed in a series circuit between the lamp filaments in accordance with the circuit diagram of Fig. 8, but still mounted at a point remote from the lamp socket.

What I claim as new and desire to secure by Letters Patent of the United States, is:

1. In combination, a lamp socket having a housing of insulating material, spaced contacts in said housing adapted to receive the contact pins of a fluorescent lamp, said socket contacts having terminal means located in recesses in said housing, a member of insulating material having spaced studs projecting from the upper face of said member and being located in the recesses in said housing, said member having receptacle means including contact elements for receiving a container having contact prongs, said contact elements themselves being provided with terminal means, and means for electrically interconnecting in series one of the terminal means of the socket contacts and one of the terminal means of the contact elements.

2. In combination, a lamp socket having a housing of insulating material, spaced contacts in said housing adapted to receive the spaced contact pins of a fluorescent lamp, said socket contacts having terminal means located in recesses in said housing, a member of insulating material having insulated spaced studs projecting from the upper face of said member being located in the recesses in said housing, a bolt extending through said member and a portion of said socket housing, said member having receptacle means including contact elements for cooperation with a container having contact prongs, said contact elements themselves being provided with terminal means, and means for electrically interconnecting in series one of the terminal means of the socket contacts and one of the terminal means of the contact elements.

3. In combination, a lamp socket having a housing of insulating material, spaced contacts in said housing adapted to receive the spaced contact pins of a fluorescent lamp, said contacts having terminal means located in recesses in said housing, a member of insulating material having insulated spaced studs projecting from the upper face of said member and being located in the recesses in said housing, said member having receptacle means including contact elements for receiving a container having contact prongs, said receptacle elements themselves being provided with terminal means and a screw threaded into one of the terminal means of the socket contacts and engaging one of the terminal means of the contact elements for electrically interconnecting in series these terminal means.

4. In combination, a lamp socket having a housing of insulating material, spaced contacts in said housing adapted to receive the spaced contact pins of a fluorescent lamp, said socket contacts being provided with terminal means, a member of insulating material, said insulating member having receptacle means including contact elements for receiving a container having contact prongs, said receptacle elements themselves being provided with terminal means, and interengaging means on said member and socket housing for positioning said member on said housing including screw means threaded into one of the terminal means of the socket contacts and engaging one of the terminal means of the contact elements for electrically interconnecting these terminal means in series.

5. A member for use with a lamp socket having spaced contacts mounted in recesses in a housing comprising, in combination, a base of insulating material, means projecting from the upper face of said base and adapted to nest within the recesses in said socket for positioning said base on the socket housing, receptacle means on said base including spaced contacts, and a pin engaging one of said receptacle contacts passing through said base and adapted to engage one of said socket contacts for electrically interconnecting these contacts in series.

6. A member for use with a lamp socket having spaced contacts mounted in recesses in a housing comprising, in combination, a base of insulating material having spaced lugs projecting from the upper face of said base and adapted to nest within the recesses in said socket for positioning said base on the socket housing, receptacle means on said base including spaced contacts and a pin engaging one of said receptacle contacts passing through said base and adapted to engage one of said socket contacts for electrically interconnecting these contacts in series.

7. A member for use with a lamp socket having spaced contacts mounted in recesses in a housing comprising, in combination, a base of insulating material, means projecting from the upper face of said base and adapted to nest within the recesses in said socket for positioning said base on the socket housing, receptacle means on said base including a recess having keyhole slots and contacts adjacent said slots and a pin engaging one of said receptacle contacts and adapted to engage one of the socket contacts for electrically interconnecting these contacts in series.

8. In combination, a lamp socket having a housing provided with an extending portion and a base portion, spaced contacts in the extending portion of said housing and adapted to receive the spaced contact prongs of a fluorescent lamp, said spaced contacts being provided with laterally extending terminal portions disposed within the base of the housing, a member of insulating material having receptacle means including contact elements for receiving a container having contact prongs, said last-mentioned contact elements themselves being provided with laterally extending terminal means, and screw means extending from the terminal portion of one of the socket contacts to the terminal means of one of the contact elements for making a series electrical connection therewith, and a second screw means passing through said member and engaging the terminal portion of the other of the socket contacts for making electrical connection therewith said member being provided with a recess in a side face thereof for access to said last-mentioned screw means.

9. In combination, a socket housing of insulating material having an extension and a base extending at angles to each other, said base being provided with spaced recesses therein, spaced contacts in said extension adapted to receive the prongs of a fluorescent lamp, said prong receiving contacts having laterally extending terminal portions disposed within the recesses in said base, a supporting member of insulating material having a receptacle means including contact elements for receiving a container having contact prongs, said receptacle contact elements themselves being provided with laterally extending terminal portions, said supporting member being provided with spaced integral studs extending from a flat face thereof, said studs extending into the recesses on the base for mounting the housing in position on the flat face of the supporting member, and conducting means extending from the terminal portion of one of the socket contacts through one of said studs and engaging the terminal portion of one of the contact elements for making a series electrical connection therewith and for holding said housing in position on said supporting member.

10. In combination, a lamp socket having a housing of insulating material, spaced contacts in a side face of said housing adapted to receive the spaced contact pins of a fluorescent lamp, said contacts having terminal means located in recesses in said housing, a member of insulating material having insulated spaced studs projecting from the upper face thereof and being located in the recesses in said housing, said member having receptacle means including contact elements for receiving a container having contact prongs, said receptacle contact elements themselves being provided with terminal means, spaced openings extending through said member adjacent one of said studs, and a screw threaded into one of the terminal means of the socket contacts extending through one of said openings and engaging one of the terminal means of the contact elements for electrically interconnecting in series these terminal means.

11. In combination, a socket housing of insulating material having an extension and a base extending at angles to each other, said base being provided with spaced recesses therein, spaced contacts in said extension adapted to receive the prongs of a fluorescent lamp, said prong receiving contacts having laterally extending terminal portions disposed within the recesses in said base, a supporting member of insulating material having receptacle means including contact elements for receiving a container having contact prongs, said receptacle contact elements themselves being provided with laterally extending terminal portions, said supporting member being provided with spaced integral studs extending from a flat face thereof, said studs extending into the recesses on the base for mounting the housing in position on the flat face of the supporting member, spaced openings extending through the supporting member adjacent one of said studs and conducting means extending from the terminal portion of one of the socket contacts through one of said openings and engaging the terminal portion of one of the contact elements for making a series electrical connection therewith.

12. An adapter of the character described comprising, a base member of insulating material recessed to receive the base portion of a starting switch, said recess having a flat bottom portion provided with a pair of spaced arcuate slots to receive the contact pins of the starting switch and permit rotation of the switch within the recess, and a pair of elongated resilient contact members of greater length than said slots mounted upon the bottom of the base member and extending longitudinally thereof along the outside edges of said arcuate slots and having bent-over terminal portions at one end only for attaching said members to the base member in oppositely disposed relation, said contact members having indented portions intermediate their ends extending inwardly over the outside edges of the slots intermediate their ends disposed to be engaged by the contact pins of the starting switch upon rotation of said switch within the recess, whereby said prongs ride over the indented portions of the contact members into engagement with the free ends thereof, which function to urge the prongs into engagement with the inside edges of the slots by sidewise force.

13. An adapter for supporting and providing electrical connections for a starting switch for an electric-discharge device comprising, a one-piece elongated molded base member provided with a recess in the top to receive the base of a starting switch and with elongated shallow recesses on the underside thereof and on opposite sides of the longitudinal axis of the base member, the bottom of the top recess having a pair of spaced apart arcuate openings therethrough to receive the contact prongs of the starting switch and permit rotation of the switch within the recess, said openings communicating with the bottom recesses, an elongated contact spring mounted in each of the bottom recesses and extending longitudinally of the base member adjacent said openings, each of said contact springs being attached to the base member at one end only and having their free ends in oppositely disposed relation, said springs being of such length as to extend beyond the ends of the openings and having intermediate protruding portions extending over said openings intermediate their ends whereby they are engaged by the contact prongs of the control switch when rotated and urged transversely to exert force against the sides of the contact prongs and urge said prongs against the edges of the openings, and a cover plate attached to the bottom of the base member over said shallow recesses.

14. An adapter for use with lampholders for discharge lamps to support and provide electrical connections for a control switch having spaced contact pins comprising, an elongated base member having a mounting portion on the top at one end thereof to receive the base of the lampholder and a cylindrical well adjacent the other end to receive the control switch, the bottom of said well having a pair of curved elongated openings therein spaced apart to receive the contact pins on the control switch and permit rotary movement of the switch within the well, a pair of elongated shallow recesses formed in the bottom of the base member underneath the well, and an elongated slender contact spring of greater length than that of the opening in the well positioned in each of said bottom recesses and attached to the base member at one end only with their free ends in oppositely disposed relation, said contact springs being curved about the openings in the bottom of the well and having indentend portions extending inwardly over the edges of said openings intermediate their ends to be engaged by one side only of the contact pins when the control switch is rotated in the well to mechanically lock the control switch in operating position by urging the said contact pins against the edges of the curved openings in the bottom of the well.

15. An adapter for mounting a control switch for use with electric discharge lamps and the like, comprising, a base member of insulating material having a mounting surface on the top thereof at one end with spaced lugs extending upwardly therefrom to receive the base portion of a lampholder, said base member having a cylindrical well in the top thereof at the other end to receive the control switch, said well having a flat bottom portion provided with a pair of spaced arcuate openings to receive the contact pins on the control switch when said switch is inserted into the well and permit rotary movement of the said switch, a pair of elongated slender contact springs mounted on the underside of the base member in close proximity to the bottom of the well and having terminal members at one end only interfitting with recesses in the bottom of said base member to support said springs from one end only thereof, said springs being mounted with their free ends in oppositely disposed relation longitudinally of the base member alongside the arcuate openings in the bottom of the well and having indented portions positioned over the edges of the said openings intermediate their ends to be engaged by the contact pins when the control switch is rotated in the well, the indented portions of the springs being adapted to snap over the contact pins to force said pins into engagement with the edges of the elongated openings to releasably lock said pins in position at the ends of the openings.

16. An adapter for use with lampholders for discharge lamps to support and provide electrical connections for a control switch having spaced contact pins comprising, an elongated base member of insulating material having a raised mounting portion at one end thereof with upwardly extending positioning lugs thereon to receive the base of the lampholder and a cylindrical well adjacent the other end to receive the control switch, said well having a flat bottom portion spaced from the bottom of the base member, the bottom of the well having a pair of elongated and generally keyhole shaped openings therein spaced apart to receive the contact pins of the control switch and permit rotary movement of the switch therein, said openings being oppositely disposed in generally parallel relation on either side of the longitudinal axis of the base member, the bottom of the base member being provided with a pair of relatively deep recesses underneath the raised mounting portion and a pair of elongated shallow receses underneath the well, an elongated resilient contact member of greater length than the openings in the bottom of the well mounted in each of the shallow recesses, said contact members extending lengthwise of the base member and having terminal members at one end only one of which is positioned within one of said relatively deep recesses in the base and the other of which is positioned in a third recess at the opposite end of the base member at the end of one of the shallow recesses so that the free ends of the contact members are oppositely disposed, said contact members being positioned beneath and alongside the openings in the bottom of the well and having indented portions extending over the edges of the keyhole shaped openings intermediate their ends so as to be engaged by one side only of the contact pins on the control switch as it is rotated in the well, said contact member functioning to force the contact pins of the control switch into engagement with the ends of the keyhole shaped openings.

17. In combination, a lampholder for discharge lamps comprising a generally hollow housing of insulating material with a base portion open at the bottom and having elongated contact elements mounted therein with terminal portions anchored in the base portion, an adapter for mounting a control switch having contact prongs for starting the lamp adjacent the lampholder comprising a base member of insulating material having a mounting portion on the top at one end of generally the same size and configuration as the base portion of the lampholder with lugs extending upwardly therefrom into the base portion of the lampholder and a relatively deep well at the other end to receive the control switch, said well having a flat bottom portion with spaced arcuate openings to receive the contact prongs of the control switch and permit rotation thereof within the well, a pair of elongated resilient contact elements mounted on the bottom of the base member and having terminal portions at one end only anchored to the base member with their free ends oppositely disposed to be engaged by the contact prongs of the control switch when it is rotated in the well, one of said terminal portions being positioned beneath the mounting portion of the base member and the other at the opposite end thereof, and a terminal screw extending upwardly through the terminal portion positioned beneath the mounting portion of the base member into the base portion of the lampholder housing into engagement with the terminal portion of one of the contact elements of the lampholder to retain the lampholder and adapter together in operating relation and provide an electrical connection between said terminal portions.

FRANK C. DE REAMER.